(12) United States Patent
Hawtof et al.

(10) Patent No.: US 6,650,815 B2
(45) Date of Patent: Nov. 18, 2003

(54) OPTICAL FIBER ENCODED WITH DATA SIGNAL

(75) Inventors: Daniel W. Hawtof, Painted Post, NY (US); David M. Hopstock, Roseville, MN (US); Gregory F. Jacobs, Elmira, NY (US)

(73) Assignee: Corning Incorporated, Corning, NY (US)

( * ) Notice: Subject to any disclaimer, the term of this patent is extended or adjusted under 35 U.S.C. 154(b) by 101 days.

(21) Appl. No.: 09/956,563

(22) Filed: Sep. 18, 2001

(65) Prior Publication Data

US 2003/0026568 A1 Feb. 6, 2003

Related U.S. Application Data (60) Provisional application No. 60/258,389, filed on Dec. 27, 2000.

(51) Int. Cl.⁷ ................................................. G02B 6/02
(52) U.S. Cl. ...................................................... 385/128
(58) Field of Search ................................. 385/123, 127, 385/128, 141; 427/163.1

(56) References Cited

U.S. PATENT DOCUMENTS

| 4,629,285 A | 12/1986 | Carter et al. ............... 385/128 |
| 4,782,294 A | 11/1988 | Libert et al. ............... 324/206 |
| 4,960,318 A | 10/1990 | Nilsson et al. .............. 385/103 |
| 5,006,806 A * | 4/1991 | Rippingale et al. ......... 324/326 |
| 5,111,523 A | 5/1992 | Ferlier et al. ............... 385/100 |
| 5,119,464 A | 6/1992 | Freychet et al. ............ 385/147 |
| 5,213,212 A | 5/1993 | Holzschuh ................... 206/397 |
| 5,262,726 A | 11/1993 | Kohmura et al. ............ 324/232 |
| 5,379,363 A | 1/1995 | Bonicel et al. .............. 385/114 |
| 5,426,716 A * | 6/1995 | Arroyo et al. ............... 385/100 |
| 5,620,753 A | 4/1997 | DiVita et al. ............... 427/547 |
| 5,642,455 A | 6/1997 | Divita et al. ................ 385/128 |
| 5,796,905 A | 8/1998 | Hoffart et al. .............. 385/128 |
| 5,809,195 A | 9/1998 | Brown et al. ............... 385/114 |
| 5,821,510 A | 10/1998 | Cohen et al. ............... 235/375 |
| 5,853,846 A | 12/1998 | Clark et al. ................. 428/131 |
| 6,072,930 A | 6/2000 | Kornreich et al. ........... 385/123 |
| 6,282,353 B1 * | 8/2001 | Clark .......................... 385/99 |
| 6,293,081 B1 * | 9/2001 | Grulick et al. ................ 57/293 |

FOREIGN PATENT DOCUMENTS

| EP | 0155092 B1 | 11/1987 | ............ G02B/6/22 |
| WO | WO 00/00859 | 1/2000 | |

* cited by examiner

*Primary Examiner*—Tulsidas Patel
(74) *Attorney, Agent, or Firm*—Timothy R. Krogh; James V. Suggs; Svetlana Short

(57) ABSTRACT

The present invention relates to an optical fiber including a fiber core and at least one coating substantially encapsulating the fiber core, wherein the at least one coating includes a material forming a data storage medium which is capable of digitally encoding information at a data density of at least about 4 bits per centimeter. Both magnetically and optically encoded fibers are disclosed. Also disclosed are a method of making an optical fiber of the present invention, methods of digitally encoding information onto an optical fiber, and a method of retrieving information digitally encoded onto an optical fiber.

23 Claims, 6 Drawing Sheets

OPTICAL FIBER ENCODED WITH DATA SIGNAL

PRIORITY DOCUMENT

This application claims the benefit of U.S. patent application Ser. No. 60/258,389 filed Dec. 27, 2000, the benefit of priority is hereby claimed.

FIELD OF THE INVENTION

The present invention relates to optical fibers, more specifically optical fibers which include a data storage medium capable of being digitally encoded (or digitally encoded) with a data signal, as well as methods of making and using the same.

BACKGROUND OF THE INVENTION

Optical fibers, including fiber optic ribbons, have acquired an increasingly important role in the field of communications, frequently replacing existing copper wires. This trend has had a significant impact in the local area networks (e.g., for fiber-to-home uses), which have seen a vast increase in the usage of optical fibers. Further increases in the use of optical fibers in local loop telephone and cable TV service are expected, as local fiber networks are established to deliver ever greater volumes of information in the form of data, audio, and video signals to residential and commercial users. In addition, use of optical fibers in home and commercial business for internal data, voice, and video communications has begun and is expected to increase.

Figure 1:
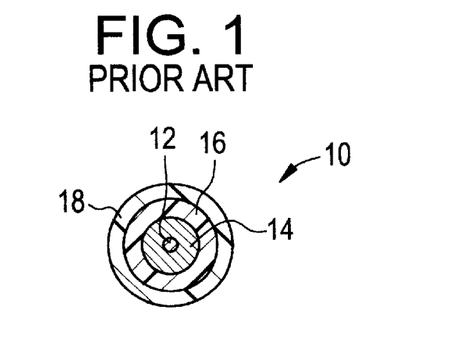
FIG. 1 is a cross-sectional view of a prior art, single-mode optical fiber.

A typical geometry for an optical fiber 10 is illustrated in FIG. 1, where the optical fiber contains a cylindrical core 12 at the center of the fiber, a cylindrical clad 14 surrounding the core, a primary or inner coating 16 which surrounds the clad, and a secondary or outer coating 18 which surrounds the primary coating. The primary coating is applied directly to the glass fiber (e.g., core and clad) and, when cured, forms a soft, elastic, and compliant material which encapsulates the glass fiber. The primary coating serves as a buffer to cushion and protect the glass fiber when the fiber is bent, cabled, or spooled. The secondary coating is applied over the primary coating and functions as a tough, protective outer layer that prevents damage to the glass fiber during processing and use.

Optical fibers are commonly used as bundles of strands with multiple fibers in a strand. It is necessary to have a means of fiber identification so that one can identify the individual fibers at the termination of such a bundle for appropriate connection of the fibers in a photonic system. Typically, optical fibers are coded for identification by a colored ink or other coating on the fiber. For example, the secondary or outer coating 18 may contain one or more colorants or dyes. One problem with the use of colorants is that the amount of information they can convey is quite limited. Moreover, the ability of the colorant to convey the necessary information is dependent upon proper identification of colors by a person working with such fibers. Fiber identification may be problematic under certain lighting conditions, where similar colorants are used on two different fibers (i.e., red versus orange), or where the colorants fade or otherwise change over time or following environmental exposure. Thus, the use of colorants is, by its very nature, of limited utility and subject to errant identification.

The present invention is directed to overcoming these deficiencies in the art.

SUMMARY OF THE INVENTION

One aspect of the present invention relates to an optical fiber including a fiber core and at least one coating substantially encapsulating the fiber core, wherein the at least one coating includes a material forming a data storage medium which is capable of digitally encoding information at a data density of at least about 4 bits per centimeter. Also disclosed are fiber bundles including one or more optical fibers of the present invention and cables including either an optical fiber of the present invention or a fiber bundle of the present invention.

Another aspect of the present invention relates to a method of making an optical fiber of the present invention. This method includes providing a fiber core and encapsulating the fiber core with a coating which includes a material forming a data storage medium capable of digitally encoding information.

A further aspect of the present invention relates to a method of digitally encoding information onto an optical fiber. This method includes preparing an optical fiber which includes a fiber core and at least one coating substantially encapsulating the fiber core, wherein the at least one coating includes a material forming a magnetic data storage medium, and exposing the optical fiber to a variable magnetic field under conditions effective to encode information onto the magnetic data storage medium.

A still further aspect of the present invention relates to another method of digitally encoding information onto an optical fiber. This method includes preparing an optical fiber which includes a fiber core and at least one coating including a material forming an optical data storage medium, and treating the optical fiber under conditions effective to encode information into the optical data storage medium.

Yet another aspect of the present invention relates to a method of retrieving information digitally encoded onto an optical fiber. This method includes providing an optical fiber including at least one coating which includes a material forming a digital data storage medium, the digital data storage medium being encoded with a data signal which carries information, and reading the optical fiber with a device which detects and processes the data signal, thereby retrieving the information.

By providing optical fibers with a coating that contains a material forming a digital data storage medium, it becomes possible to encode a data signal onto a length of fiber. This offers a significant advance over previously used dyes or colorants that were incorporated into the coating layer(s) of an optical fiber. Specifically, the data signal utilized in the present invention can encode much more information, both in complexity and volume, than previously utilized dyes and other colorants. For example, it becomes possible to indicate the product type (e.g., type of glass fiber, including core and clad) and production lot, attenuation properties, polarization mode dispersion, effective area, fiber certification standards, etc. Fibers could also be encoded with data regarding specific information concerning the particular application in which the fiber is employed, such as fiber installation, signal source, etc. Encoded data can also be utilized for manufacture and handling purposes. To convey more detailed information, the inventive articles may be encoded in more complicated patterns, as found in bar codes, credit card strips, or magnetic tape recordings.

BRIEF DESCRIPTION OF THE DRAWINGS

FIGS. 9A–B illustrate one approach for magnetizing the magnetic data storage medium circumferentially about the optical fiber. A plurality of recording heads simultaneously expose the magnetic data storage medium of the optical fiber to a data signal in the form of a variable magnetic field, which encodes the data onto the magnetic data storage medium as the fiber is drawn through the varied field. FIG. 9A is a plan view of a recording device used in-line prior to spooling of the prepared optical fiber. Although six recording heads are shown in FIG. 9B, any number of recording heads can be used to ensure that encoding the data onto the magnetic data storage medium occurs in a substantially uniform manner about the circumference of the optical fiber.

DETAILED DESCRIPTION OF THE INVENTION

One aspect of the present invention relates to an optical fiber including a fiber core and at least one coating substantially encapsulating the fiber core, wherein the at least one coating includes a material forming a data storage medium which is capable of digitally encoding information at a data density of at least about 4 bits per centimeter. Preferably, the optical fiber is encoded digitally with information at a data density as defined above.

The digital data storage medium of the optical fiber can be either a magnetic data storage medium or an optical data storage medium. Alternatively, an optical fiber of the present invention can include at least two coatings, one coating including a material forming a magnetic data storage medium and another coating including a material forming an optical data storage medium. When an optical fiber of the present invention includes both a magnetic data storage medium and an optical data storage medium, encoded regions of the two digital data storage media can be overlayed (i.e., occupying the same length of optical fiber) or encoded regions of the two data storage media can be spaced apart along the length of the fiber. The data signal of the magnetic data storage medium can be written and read independent of the data signal of the optical data storage medium.

When used in combination, the magnetic and optical data storage media can be used to both temporarily and permanently encode data onto the optical fiber. For example, it may be practical in some instances to utilize the optical data storage medium permanently to encode information about a particular optical fiber while the magnetic data storage medium can be written (and re-written) to encode data concerning the particular application of a length of optical fiber. Thus, the two digital data storage media can complement one another.

As indicated above, the minimum data density should be at least about 4 bits per centimeter. The data density is preferably at least about 10 bits per centimeter, more preferably at least about 50 bits per centimeter, most preferably at least about 100 bits per centimeter. The length of the optical fiber of the present invention can be encoded repeatedly with the same information.

Writing of the data signal is preferentially done in a rotationally symmetric manner about the fiber. For example, a signal written optically appears as a series of substantially annular rings around the fiber. Signals written in this manner can be read easily, regardless of the orientation of the fiber. However, the invention is not limited to the rotationally symmetric case. Magnetic or optical signals may be written on only a portion of the circumference of the fiber. In that case, a servo mechanism is desirable to maintain the fiber and/or the detector in the proper orientation for reading the signal. If only a portion of the circumference of the fiber is used for writing the signal, it is possible to write several independent signals as parallel tracks along the length of fiber.

For optical fibers including the material forming a magnetic data storage medium, such material is present in either the primary coating, the secondary coating, or other additional coatings.

The thickness of the coating in which the digital information is magnetically encoded is preferably between about 0.2 $\mu$m and about 35 $\mu$m. With thin coatings of about 1 $\mu$m or less, the encoded layer is preferably an outermost tertiary coating over the primary and secondary coatings. With the thin film as the outermost layer, the write and read heads can pass close to the recording layer, facilitating high data density and high output signal strength.

The number of bits that can be written per centimeter is approximately equal to the number of flux changes per centimeter of the recording code. The minimum wavelength of the recorded signal, $\lambda_{min}$, is approximately twice the reciprocal of the number of flux changes per centimeter. Because of the spacing loss phenomenon, $\lambda_{min}$ should be at least 4 times the spacing between the recording (or the read) head and the magnetic layer. For magnetic recording on flat substrates it has been found that the optimal thickness of the recorded layer is about 0.25 $\lambda_{min}$. The same general considerations apply to recording on a magnetic layer on a substantially cylindrical fiber. With recording layers thinner than the optimum, the output voltage decreases. With layers thicker than the optimum, because of the phenomenon of thickness loss, the output voltage increases little with further increase in thickness. On the other hand, an excessively thick magnetic coating has several disadvantages: magnetic transitions that define the bits of information become less well-defined, and it becomes more difficult to overwrite previously recorded information. With continuous films of high saturation magnetization, such as metallic films, the film thickness can be considerably less than the optimal thickness and still produce detectable signals.

For example, when recording 200 bits of information per centimeter of fiber length, the minimum wavelength would be about 100 $\mu$m and the optimal coating thickness would be about 25 $\mu$m. Thus, for a fiber to be recorded with an information density of 200 bits/cm, a coating thickness between about 20 and 30 $\mu$m would be preferred. The distance of the recording head from the magnetic layer of the fiber would preferably be less than about 25 $\mu$m. Assuming that primary and secondary coatings are each about 25–30 $\mu$m in thickness and that the read and write heads could be brought down very close to or in contact the fiber surface, acceptable read/write conditions could be achieved by making the magnetic layer either the primary or the secondary coating. If the write and read heads are to function at a significant distance away from the fiber surface, the magnetic layer is preferably the secondary coating.

The choice of material forming the magnetic data storage medium and the choice of coating utilized for the at least one coating should be selected based on their compatibility. Suitable materials forming the magnetic data storage medium include, without limitation, either a plurality of magnetizable particles or a continuous magnetic film. Suitable coatings include, without limitation, continuous magnetic films, water-borne coatings and solvent-borne coatings, thermoplastic coatings, and polymeric matrices.

In general, the plurality of magnetizable particles is preferably utilized in the water-borne coatings and solvent-borne coatings, thermoplastic coatings, and polymeric matrices, whereas the continuous magnetic film itself functions as both the coating and the material forming the magnetic data storage medium.

Any suitable magnetic film can be employed in an optical fiber of the present invention. Such films can include magnetic metals (e.g., cobalt), metal oxides (e.g., magnetic ferrites), or metal alloys (e.g., cobalt alloyed with chromium, platinum, tantalum, niobium, nickel, etc.), where the film itself can be magnetized along portions thereof. It may also be advantageous to utilize non-magnetic underlayers and protective overlayers when such a continuous magnetic thin film is employed. The use of such underlayers and overlayers is described, for example, in Chen et al., *IEEE Transactions of Magnetics* Vol. 35, p. 2637 (1999), which is hereby incorporated by reference.

Magnetic films, as well as any underlayers or overlayers, can be applied by vapor deposition techniques, by sputtering, electron beam evaporation, or electroless or electrochemical deposition processes. Application of the magnetic film can be performed during an in-line draw process, either directly onto the fiber core or onto another coating.

The saturation magnetization for continuous magnetic films typically ranges from about 250 to about 1750 emu/cm$^3$.

Any suitable water-borne and solvent-borne coatings can be employed in an optical fiber of the present invention. Exemplary water-borne coatings or solvent-borne coatings include, without limitation, silicone, acrylic, polyester, polyurethane, and the like.

Any suitable thermoplastic coating can be employed in an optical fiber of the present invention. Exemplary thermoplastic coatings include, without limitation, those formed of polyamide, polyethylene, polypropylene, polyester, polysulfone, acrylic resins, methacrylic resins, polyvinyl chloride, polyphenylene oxide, polyphenylene sulfide, and fluorocarbon resins, as well as blends of such resins.

Any suitable polymeric matrix can be employed in an optical fiber of the present invention. Polymeric matrices are characterized by a substantially polymerized matrix which is the polymerization (i.e., cured) product of a coating composition that includes one or more monomeric components and, optionally, one or more oligomeric components.

The oligomeric component of the polymerizable composition can include a single type of oligomer or it can be a combination of two or more oligomers. When employed, if at all, the oligomer is preferably capable of addition polymerization (e.g., an ethylenically unsaturated oligomer). Suitable oligomers can be either monofunctional oligomers or polyfunctional oligomers, although polyfunctional oligomers are preferred. The oligomeric component can also be a combination of a monofunctional oligomer and a polyfunctional oligomer. Oligomers employed in the compositions of the present invention can contain acrylate, methacrylate, acrylamide, N-vinyl amide, styrene, vinyl ether, vinyl ester, or other known functional groups on a polyether-, polyester-, polycarbonate-, polyamide-, polyurethane-, or polyurea-diisocyanate backbone. Exemplary oligomers of this type are described in U.S. Provisional Patent Application Ser. No.

60/173,874, entitled "Secondary Coating Composition For Optical Fibers" to Sheng, filed Dec. 30, 1999, and U.S. patent application Ser. No. 09/301,814 to Fewkes et al., filed Apr. 29, 1999, which are hereby incorporated by reference.

Urethane acrylate oligomers are conventionally provided by reacting an aliphatic or aromatic diisocyanate with a dihydric polyether or polyester, most typically a polyoxyalkylene glycol such as a polyethylene glycol. Such oligomers typically have 4–10 urethane groups and may be of high molecular weight, e.g., 2000–8000. However, lower molecular weight oligomers, having molecular weights in the 500–2000 range, may also be used. U.S. Pat. No. 4,608,409 to Coady et al. and U.S. Pat. No. 4,609,718 to Bishop et al., which are hereby incorporated by reference, describe such syntheses in detail.

When it is desirable to employ moisture-resistant oligomers, they may be synthesized in an analogous manner, except that the polar polyether or polyester glycols are avoided in favor of predominantly saturated and predominantly nonpolar aliphatic diols. These diols include, for example, alkane or alkylene diols of from 2–250 carbon atoms and, preferably, are substantially free of ether or ester groups. The ranges of oligomer viscosity and molecular weight obtainable in these systems are similar to those obtainable in unsaturated, polar oligomer systems, such that the viscosity and coating characteristics thereof can be kept substantially unchanged. The reduced oxygen content of these coatings has been found not to unacceptably degrade the adherence characteristics of the coatings to the surfaces of the glass fibers being coated.

As is well known, polyurea components may be incorporated in oligomers prepared by these methods, simply by substituting diamines or polyamines for diols or polyols in the course of synthesis. The presence of minor proportions of polyurea components in the present coating systems is not considered detrimental to coating performance, provided only that the diamines or polyamines employed in the synthesis are sufficiently non-polar and saturated as to avoid compromising the moisture resistance of the system. Polycarbonate components can also be incorporated in oligomers prepared by these methods.

The monomeric component of the polymerizable composition can include a single monomer or it can be a combination of two or more monomers. Although not required, it is preferable that the monomeric component be a combination of two or more monomers when the composition is substantially devoid of an oligomeric component. Preferably, the monomer is an ethylenically unsaturated monomer. Ethylenically unsaturated monomers may contain various functional groups which enable their cross-linking. The ethylenically unsaturated monomers are preferably polyfunctional (i.e., each containing two or more functional groups), although monofunctional monomers can also be introduced into the composition. Suitable functional groups for ethylenically unsaturated monomers used in accordance with the present invention include, without limitation, acrylates, methacrylates, acrylamides, N-vinyl amides, styrenes, vinyl ethers, vinyl esters, acid esters, and combinations thereof (i.e., for polyfunctional monomers). Exemplary monomers of this type are described in U.S. Provisional Patent Application Ser. No. 60/173,874, entitled "Secondary Coating Composition For Optical Fibers" to Sheng, filed Dec. 30, 1999, and U.S. patent application Ser. No. 09/301,814 to Fewkes et al., filed Apr. 29, 1999, which are hereby incorporated by reference.

In general, individual monomers capable of about 80% or more conversion (i.e., when cured) are more desirable than those having lower conversion rates. The degree to which monomers having lower conversion rates can be introduced into the composition depends upon the particular requirements (i.e., strength) of the resulting cured product. Typically, higher conversion rates will yield stronger cured products.

Most suitable monomers are either commercially available or readily synthesized using reaction schemes known in the art. For example, most monofunctional monomers can be synthesized by reacting an appropriate alcohol or amide with an acrylic acid or acryloyl chloride according to synthesis schemes known in the art.

Compositions capable of forming a polymeric matrix may also contain a polymerization initiator that promotes polymerization (i.e., curing) of the composition after its application to a glass fiber or previously coated glass fiber. Polymerization initiators suitable for use in the compositions of the present invention include thermal initiators, chemical initiators, electron beam initiators, microwave initiators, actinic-radiation initiators, and photoinitiators. Particularly preferred are the photoinitiators. For most acrylate-based coating formulations, conventional photoinitiators, such as the known ketonic photoinitiating and/or phosphine oxide additives, are preferred. When used in the compositions of the present invention, the photoinitiator is present in an amount sufficient to provide rapid ultraviolet curing. Generally, this includes about 0.5 to about 10.0 weight percent, more preferably about 1.5 to about 7.5 weight percent.

The photoinitiator, when used in a small but effective amount to promote radiation cure, should provide reasonable cure speed without causing premature gelation of the coating composition. A desirable cure speed is any speed sufficient to cause substantial curing (i.e., greater than about 90%, more preferably 95%) of the coating composition. As measured in a dose versus modulus curve, a cure speed for coating thicknesses of about 25–35 $\mu$m is, e.g., less than 1.0 J/cm$^2$, preferably less than 0.5 J/cm$^{2.}$ The various coating compositions can also contain an additive or a combination of additives. Suitable additives include, without limitation, antioxidants, catalysts, lubricants, low molecular weight non-crosslinking resins, adhesion promoters (U.S. Pat. No. 5,146,531 to Shustack and U.S. patent application Ser. No. 09/301,814 to Fewkes et al., filed Apr. 29, 1999, which are hereby incorporated by reference), tackifiers (U.S. patent application Ser. No. 09/476,151 to Fewkes et al., filed Dec. 30, 1999, which is hereby incorporated by reference), and stabilizers. Some additives can operate to control the curing process, thereby affecting the physical properties (e.g., modulus, glass transition temperature) of the resulting coating. Others can affect the integrity of the resulting coating by protecting, for example, against de-polymerization or oxidative degradation.

A number of suitable primary and secondary coating compositions are commercially available from various vendors, such as DSM Desotech (Elgin, Ill.).

As indicated above, it is desirable to utilize a plurality of magnetizable particles in conjunction with water-borne or solve-borne coatings, thermoplastic coatings, and polymeric matrices. The magnetizable particles can be of a single type or a combination of particle types, i.e., formed of a different metallic compound or alloy and/or differently shaped particles.

Many types of particles that are capable of being magnetized are known to those familiar with the magnetic materials art. The major axis length of such particles (i.e., the maximum length in any direction) suitable for use in this invention ranges from about 2 μm down to about 10 μm, preferably about 1 μm down to about 20 nm. The saturation magnetization of the magnetizable particles can range from about 10 to about 200 emu/g (electromagnetic units/gram), and is preferably greater than 50 emu/g. When magnetized, the coercivity of such particles can be either low (i.e., less than about 100 oersteds), moderate (i.e., between about 100 to about 2,000 oersteds), high (i.e., greater than about 2,000 oersteds), or combinations thereof. Preferably, the coercivity of such particles can range from about 100 up to about 20,000 oersteds, more preferably ranging from about 300 to about 3,000 oersteds. Particles with coercivities less than about 300 oersteds may be too easily accidentally demagnetized, while particles with coercivities greater than 3,000 oersteds may be too difficult to magnetize with conventional recording heads.

One class of high-performance magnetizable particles are the rare earth-metal alloy type materials. Examples of the incorporation of such particles into a polymeric binder include U.S. Pat. No. 4,497,722 to Tsuchida et al. (describes the use of samarium-cobalt alloy particles) and European Patent Application No. 260,870 (describing the use of neodymium-iron-boron alloy particles), both of which are hereby incorporated by reference.

Many other types of metal or metal-alloy magnetizable particles can also be used, including, without limitation, Alnico (aluminum-nickel-cobalt-iron alloy), iron, iron-carbide, iron-nitride, iron-cobalt, iron-cobalt-chromium, iron-cobalt-molybdenum, iron-cobalt-vanadium, copper-nickel-iron, manganese-bismuth, manganese-aluminum, and cobalt-platinum alloys.

The most commonly used metallic particles for magnetic recording are small acicular (needle-like) particles known as "metal particles." They are predominantly metallic iron, but contain other elements such as cobalt and silicon, and are covered by a thin outer oxidized passivation layer.

A preferred class of stable magnetic oxide materials is known as the hexagonal magnetic ferrites. One preferred material is the hexagonal phase of the magnetoplumbite structure commonly known as barium hexaferrite, which is generally produced as flat hexagonal platelets. Strontium and lead can substitute in part or completely for the barium, and many other elements can partially substitute for the iron. Thus, strontium hexaferrite is also a preferred material.

Another class of preferred materials is the cubic magnetic ferrites, which are sometimes produced as cubic particles, but more often as elongated needle-like, or acicular, particles. Examples include magnetite ($Fe_3O_4$), maghemite or gamma ferric oxide (gamma-$Fe_2O_3$), intermediates of these two compounds, and cobalt-substituted modifications of the two compounds or of their intermediates. All of these magnetic ferrites can be prepared with coercivities in the preferred 300 to 3000 oersted range. Many of them are currently being manufactured in large commercial quantities at relatively low cost. Because the magnetic ferrites are highly chemically stable, their use is preferred for coating optical fibers that will be exposed to corrosive conditions. Examples of corrosive conditions are one or more of the following: (1) high temperatures, such as those above about 80° F.; (2) high humidity levels, such as those above about 70% relative humidity; (3) exposure to corrosive gases, such as $SO_2$ and $NO_2$; and (4) exposure to corrosive aerosol particles of salts, such as NaCl and $NH_4NO_3$.

Chromium dioxide is another alternate material which may be useful as a magnetizable particle in the invention due to its low Curie temperature, which facilitates thermo-remanent magnetization methods.

The magnetizable particles are generally dispersed homogenously in the coating composition such that the magnetizable particles will constitute at least about 1 percent by volume of the dried or cured coating, preferably between about 1 percent and about 90 percent by volume, more preferably about 10 percent and about 70 percent by volume. To obtain the highest remanent magnetization, the particles preferably are substantially single-domain-size, anisotropic particles, and there preferably is substantially parallel alignment of preferred magnetic axes of a sufficient number of the particles so as to make the magnetic data storage media itself anisotropic.

When the material forming the magnetic data storage medium is a plurality of magnetizable particles, it is often desirable for the coating composition to contain other additives. Such additives include, without limitation, head cleaning agents, which typically are abrasive materials such as alumina; lubricants, which are oily components that remain in liquid form despite curing of the coating; wetting agents or dispersants, either independent of or incorporated directly into the components of the at least one coating; carbon black, which decreases coating resistivity and thereby reduces static build-up; and anti-fungal agents.

Preferred orientation of the magnetic axes is obtained by physically orienting the particles during the coating and drying (curing) processes. There are at least four mechanisms through which particles can become preferentially oriented: (1) as a result of shear forces the particles experience during the coating process; (2) as a result of forces the particles experience during drying of the coating; (3) as a result of coating and drying in an applied magnetic field; and (4) as a result of compressive stress applied to the dried coating. While any of these mechanisms can be employed, their efficacy will depend, at least in part, on the shape of the magnetic particles to be oriented.

For acicular particles, at least four modes of possible particle orientation with respect to the fiber axis can be identified: (1) longitudinal, where the long axes of the particles are substantially parallel to the axis of the fiber; (2) tangential, where the long axes of the particles are substantially tangential to the circular cross section of the fiber; (3) radial, where the long axes of the particles are substantially perpendicular to the central axis of the fiber; and (4) transverse, where the long axes of the particles are all substantially parallel to each other and at right angles to the axis of the fiber. The shear stresses acting during the coating process will tend to orient the particles either longitudinally or tangentially, particularly if the coated fiber is drawn through a metering die, with some preference for longitudinal orientation. The drying process will also promote longitudinal or tangential orientation. Since the long axes of the particles will tend to rotate into a position parallel to an applied magnetic field, longitudinal orientation can be enhanced if during coating and drying a magnetic field is applied parallel to the fiber axis.

For platelet-shaped particles, the easy direction of magnetization is in the short direction of the platelet, perpendicular to its plane. With these particles, forces generated during coating and drying will tend to orient the particles in the radial direction. The types of orientation that can be promoted by an external field—longitudinal or transverse—are counter to the natural radial orientation at least to some extent. Thus, when it is desired that the magnetizable particles be oriented in a radial direction, coatings containing platelet-shaped particles generally should not be exposed to an orienting magnetic field prior to or during curing of the composition.

Figure 2:
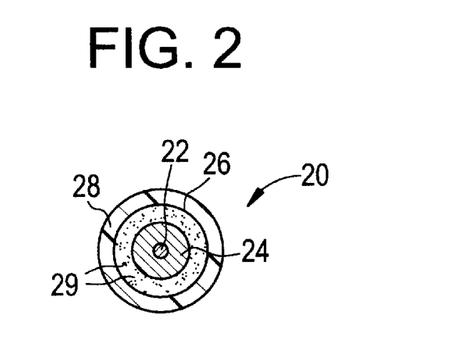
FIG. 2 is a cross-sectional view of a single-mode optical fiber of the present invention which includes a primary coating that contains a material forming a magnetic data storage medium.

According to one embodiment, shown in FIG. 2, a single-mode optical fiber 20 of the present invention contains a cylindrical core 22, a cylindrical clad 24 surrounding the core, a primary coating 26 which surrounds the clad, and a secondary coating 28 which surrounds the primary coating. In the primary coating is a plurality of magnetizable particles 29 forming a magnetic data storage medium.

Figure 3:
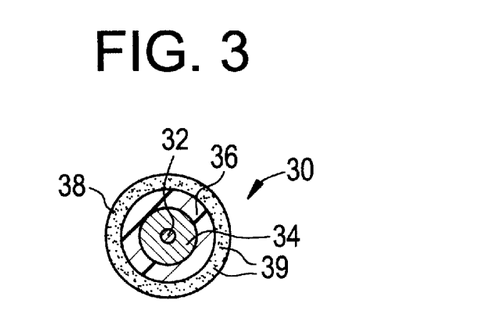
FIG. 3 is a cross-sectional view of a single-mode optical fiber of the present invention which includes a secondary coating that contains a material forming a magnetic data storage medium.

According to another embodiment, shown in FIG. 3, a single-mode optical fiber 30 of the present invention contains a cylindrical core 32, a cylindrical clad 34 surrounding the core, a primary coating 36 which surrounds the clad, and a secondary coating 38 which surrounds the primary coating. In the secondary coating is a plurality of magnetizable particles 39 forming a magnetic data storage medium.

Figure 4:
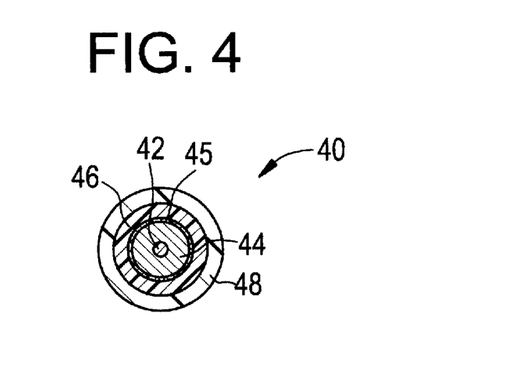
FIG. 4 is a cross-sectional view of a single-mode optical fiber of the present invention which includes a continuous magnetic film applied directly to the glass fiber, with overlayed primary and secondary coatings. The continuous magnetic film itself forms a magnetic data storage medium.

According to yet another embodiment, shown in FIG. 4, a single-mode optical fiber 40 of the present invention contains a cylindrical core 42, a cylindrical clad 44 surrounding the core, a continuous magnetic film 45 which surrounds the clad, a primary coating 46 which surrounds the magnetic film, and a secondary coating 48 which surrounds the primary coating. The continuous magnetic film is of the type described above, which is formed of a magnetic metal, metal oxide, or metal alloy. The continuous magnetic film forms a magnetic data storage medium.

Although each of the optical fibers shown in FIGS. 2–4 are illustrated as single-mode fibers, it should be readily apparent to those of skill in the art that the present invention is not limited to single-mode optical fibers and can be employed on any other suitable optical fiber design now known or hereafter developed.

For optical fibers including the material forming an optical data storage medium, such material is present in either the primary coating, the secondary coating, or other additional coatings. One criteria for the coating which contains the material forming an optical data storage medium is that the material be visible beneath any externally applied coatings.

The material forming the optical data storage medium is applied to the optical fiber such that the fiber is marked with areas of contrasting reflectivity (or color) in at least a limited portion of the optical, infrared, or ultraviolet spectrum range. The areas of contrasting reflectivity provide the requisite linear data density (at least about 4 bits per cm) as noted above. As used hereinafter, the terms "contrasting color" or "contrasting reflectivity" refer to differences in reflectivity in the visible regions of the spectrum as well as in the infrared and ultraviolet regions of the spectrum that may only be detectable by instruments other than the human eye.

To achieve the areas of contrasting color, the fiber is coated with a layer of material designed to facilitate the writing and permanent retention of such coded information. The fiber at this point does not have the areas of contrasting color, but does have a layer designed to facilitate writing on the fiber to create areas that contrast with the original appearance of the layer. The colorants may already be present in the layer (to be activated by, e.g., electromagnetic radiation or heat) or may be subsequently applied to the layer (such as in a receptor layer for inkjet printing).

Suitable colorants include, without limitation, pigments, dyes, photo-sensitive colorants, thermally-sensitive colorants, radiation sensitive colorants, or combinations thereof.

The areas of contrasting color preferably are present on the optical fiber in the form of a plurality of spaced, substantially annular bands of colorants. Although non-annular bands of the colorants can be employed, this is less desirable due to difficulties presented in reading data encoded onto the optical fiber. Depending upon the type of colorants employed, treatment of the at least one coating may or may not be needed to form the plurality of spaced, substantially annular bands. For example, upon spraying of an ink (which includes a pigment) directly onto the optical fiber (i.e., onto an inkjet receptor coating), when dried the ink forms the plurality of substantially annular bands. Alternatively, for example, upon spraying of a coating which includes a thermally sensitive colorant directly onto the optical fiber, a further thermal treatment is needed to effect the change in color or light reflective properties such that the colorant forms the plurality of spaced, substantially annular bands.

To produce sufficient contrast in the areas of reflectivity, it may also be desirable to provide, e.g., a white pigmented coating which lies beneath the optical data storage medium and which offers a sharp contrast to the material forming the optical data storage medium. One approach for accomplishing this is to introduce a white pigment into a primary coating (see U.S. Pat. No. 5,259,060 to Edward et al., which is hereby incorporated by reference).

Many different techniques are available for writing the digitally encoded information on the optical fiber. In particular, techniques can be adapted from those commonly used in the printing and graphic arts industry or in the information storage industry. Relevant techniques from the printing and graphic arts industry include direct writing methods, selective activation of colorants by electromagnetic radiation, and thermal printing. Relevant technology from the information storage industry include techniques used for write-once, DRAW (Direct Read After Write), or WORM (Write Once Read Many) optical recording on disks or tape.

By direct writing methods, it is intended that the information is digitally encoded on the optical fiber by directly applying material of contrasting color to the surface of the fiber. In one example of this method, inkjet printing, a liquid ink is projected from an orifice as a series of droplets onto the surface of the article to be marked, where it dries or hardens to form permanent markings. Most commonly the ink is a liquid at room temperature. For the droplets to form a clear, permanent image—without running, smearing, etc.—the object to be marked, in this case the optical fiber, is typically coated with a receptor coating chosen to give optimal image quality with that ink. Suitable receptor coatings include, without limitation, those employed in photographic grade inkjet printer paper.

The ink used for inkjet printing may be pigmented or nonpigmented (i.e., containing dyes, rather than pigments). A black inkjet ink may use very small magnetite particles as the black pigment, as in the case of certain inks that have been used for bankchecks. In that case the marking made with the ink could be detected magnetically, as well as optically. The magnetic detection would be on the basis of the induced magnetization of the magnetite, rather than on the basis of its permanent magnetization or recorded magnetic signal, which would be negligible for such very low coercivity particles.

In an alternate method of inkjet printing, the ink is made by dispersing pigment in a waxy coating material with a melting point not far above room temperature. A write head melts the waxy coating material, which is then ejected as droplets onto the surface of the optical fiber, where it cools and solidifies. In this case a receptor coating may not be necessary, but it may be desirable to apply a clear overcoat to prevent subsequent smearing of the markings, particularly under elevated temperature conditions.

Direct writing of a plurality of spaced, substantially annular bands can be achieved by deploying a plurality of inkjet nozzles in a circular array about the circumference of the fiber to be coated. Alternatively, a single nozzle can be rotated about the fiber, or the fiber can be rotated about its axis. Similarly, a second nozzle or array of inkjet nozzles can be employed to provide a clear overcoat to assist in maintaining the long-term integrity of the markings.

Electromagnetic radiation treatments can be carried out on optical fibers which have already been encapsulated with a coating that includes the colorant material. Upon exposure to suitable electromagnetic radiation of the appropriate wavelength, an irreversible chemical reaction takes place with respect to the colorant material, thereby producing a permanent color change in an irradiated portion of the coating. The photons act as initiators or catalysts for the reaction. An exemplary colorant material of such a coating is a diazo dye, whose chemistry is well known in the formation of modern blueprints. Laser diodes (again, in an annular arrangement about the circumference of the optical fiber) under control of a microprocessor can introduce a sufficient photon burst, typically in the visible or ultraviolet region, to achieve the desired chemical change.

Thermal treatments can be carried out on optical fibers which have already been encapsulated with a coating that includes a heat-sensitive colorant material. When regions of the coating are exposed to elevated temperatures, an irreversible chemical reaction takes place that produces a permanent color change. Thermal printer heads are well known in the art of facsimile devices and calculators. Such printer heads often use heated metallic elements in contact or very close proximity with the coating. While such heating elements can be employed, it is preferable to effect high-resolution localized heating from a distance by means of laser beams operating in the infrared or optical wavelength regions.

Alternatively, the thermal treatment can be performed on a coating which does not include a colorant material but instead is formed of one or more materials susceptible to physical changes upon exposure to the elevated, localized temperature. For example, a focused laser beam which produces localized heating can introduce an irreversible physical change in a coating or coating material, which in turn produces a change in reflectivity of the treated coating. Coatings which can be physically modified in this manner include metallic thin films, which can be "burned" to form an arrangement of pits or holes, and polymer films, which can be "burned" to form an arrangement of raised vesicles. In both instances, the pits or the vesicles will afford reflection characteristics different from that of untreated regions of the coating.

Figure 5:
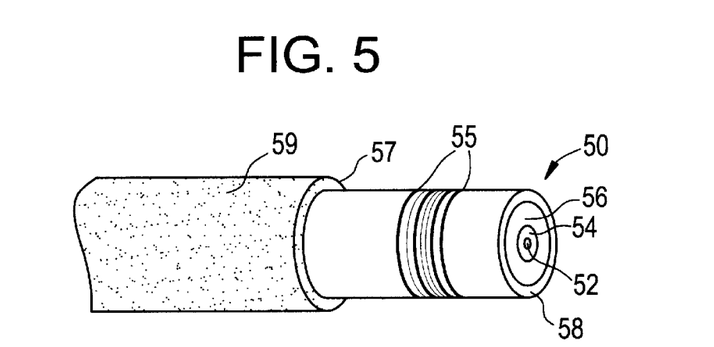
FIG. 5 is perspective view of a single-mode optical fiber of the present invention which is capable of being both magnetically and optically encoded with information. The fiber includes a primary coating, a secondary coating containing a material that allows the secondary coating to be written on by a laser, and a tertiary coating in the form of a thin, semitransparent magnetic recording layer. As shown, the tertiary coating is broken away to expose the underlying secondary coating which already has been written on to create areas of contrasting reflectivity in the form of a plurality of substantially annular bands.

According to one embodiment, an optical fiber 50 as shown in FIG. 5 includes a core 52 and clad 54, which are encapsulated by a primary coating 56. Externally of the primary coating is a secondary coating 58 which includes a material of the type described above which is sensitive to electromagnetic radiation or thermal treatment. Externally of the secondary coating 58 is a tertiary coating 57 which includes a plurality of magnetizable particles 59 forming a magnetic data storage medium. The tertiary coating 57 is sufficiently transparent to allow reading and writing on the secondary coating 58. As shown, the length of fiber 50 has been treated in a manner sufficient to afford a color change of the material in the secondary coating, thereby creating areas of contrasting reflectivity which have the form of a plurality of substantially annular bands 55. Thus, fiber 50 includes overlaid optical data storage and magnetic data storage media.

Figure 6:
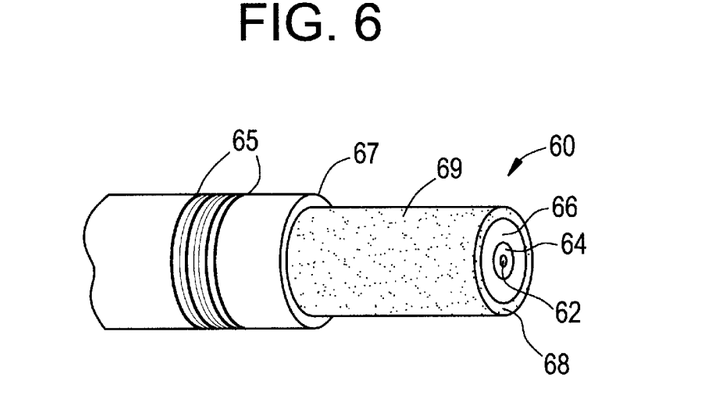
FIG. 6 is a perspective view of a single-mode optical fiber of the present invention which is capable of being both magnetically and optically encoded with information. The fiber includes a conventional primary coating, a secondary coating which includes magnetic particles to form a magnetic recording layer, and a tertiary coating containing a material that allows the tertiary coating to be written on by a laser. As shown, the tertiary coating has been written on to create areas of contrasting reflectivity in the form of a plurality of substantially annular bands, and the tertiary coating has been broken away to expose the underlying secondary coating.

According to another embodiment, an optical fiber 60 shown in FIG. 6 includes a core 62 and clad 64, which are encapsulated by a primary coating 66. Externally of the primary coating 66 is a secondary coating 68 which includes a plurality of magnetizable particles 69 that form a magnetic data storage medium. Externally of the secondary coating 68, is a tertiary coating 67 which includes a material of the type described above which is sensitive to electromagnetic radiation or thermal treatment. As shown, the length of fiber has been treated in a manner sufficient to afford a color change of the material in the tertiary coating, thereby creating areas of contrasting reflectivity which have the form of a plurality of substantially annular bands 65. Thus, fiber 60 includes overlaid optical data storage and magnetic data storage media.

Figure 7:
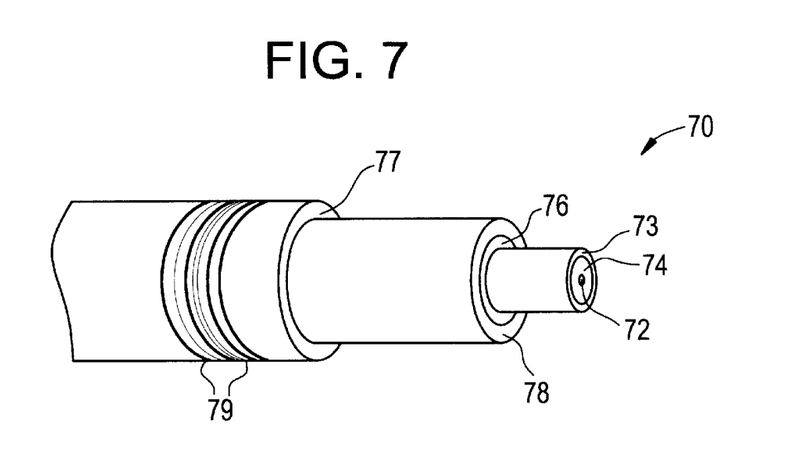
FIG. 7 is a perspective view of a single-mode optical fiber of the present invention which is capable of being both magnetically and optically encoded with information. The fiber includes a continuous magnetic film applied directly to the fiber core, a conventional primary coating, a conventional secondary coating, and an outer inkjet receptor layer. As shown, the inkjet receptor layer has been marked with a pigmented ink to create areas of contrasting reflectivity in the form of a plurality of substantially annular bands. The inkjet receptor layer has been broken away to expose underlying coatings and the primary and secondary coatings have been broken away to expose the continuous magnetic film surrounding the core.

According to yet another embodiment, an optical fiber 70 shown in FIG. 7 includes a core 72 and clad 74, which are encapsulated by a continuous magnetic film 73. Externally of the magnetic film 73 are primary coating 76 and secondary coating 78. An inkjet receptor layer 77 is applied externally of the secondary coating 78. As shown, the length of fiber 70 has been treated by passing an inkjet head over the inkjet receptor layer 77 in a manner which affords deposit of an ink onto the layer 77 to create areas of contrasting reflectivity which have the form of a plurality of substantially annular bands 79. Thus, fiber 70 includes overlaid optical data storage and magnetic data storage media.

Another aspect of the present invention relates to a method of making an optical fiber of the present invention. This method is carried out by providing a fiber core and encapsulating the fiber core with a coating which includes a material forming a data storage medium capable of digitally encoding information. This method can be performed by covering the fiber core with any of the above-described coatings (containing the material forming the optical or magnetic data storage medium). Where additional treatments of the coating are needed to form the digital data storage medium, the method of the present invention contemplates such treatments.

The core and cladding layer are typically produced in a single operation by methods which are well known in the art using known equipment, such as a draw tower. Suitable methods include: double crucible procedures as described, for example, in Midwinter, *Optical Fibers for Transmission*, New York, John Wiley, pp. 166–178 (1979), which is hereby incorporated by reference; rod-in-tube procedures; and doped deposited silica processes, also commonly referred to as chemical vapor deposition ("CVD") or vapor phase oxidation.

In the double-crucible method, a single fiber is drawn from a pair of crucibles containing, respectively, the core glass material and the clad layer glass material. The crucibles are provided such that apertures or orifices therein are concentrically aligned above one another. For example, as the melt of the core glass material flows from the orifice of one crucible, it contacts and is surrounded by the melt of the clad glass material such that the combined melts flow from the orifice of the second crucible. The glass fiber is then drawn from the combined melts flowing from the orifice of the second crucible. The double-crucible method is desirable, because it avoids the need to prepare preforms.

A variety of CVD processes are known and are suitable for producing preforms which contain core and cladding layer materials. They include external CVD processes (Blakenship et al., "The Outside Vapor Deposition Method of Fabricating Optical Waveguide Fibers," *IEEE J. Quantum Electron.*, 18:1418–1423 (1982), which is hereby incorporated by reference), axial vapor deposition processes (Inada, "Recent Progress in Fiber Fabrication Techniques by Vapor-phase Axial Deposition," *IEEE J. Quantum Electron.*18:1424–1431 (1982), which is hereby incorporated by reference), and modified CVD or inside vapor deposition (Nagel et al., "An Overview of the Modified Chemical Vapor Deposition (MCVD) Process and Performance," *IEEE J. Quantum Electron.*18:459–476 (1982), which is hereby incorporated by reference).

Once the cylindrical preform is prepared, it is locally and symmetrically heated to a temperature, e.g., of about 2000° C. As the preform is heated, such as by feeding the preform into and through a furnace, a glass fiber is drawn from the molten material.

Regardless of the approach for preparing the glass fiber, the primary, secondary, or other coating compositions are applied to the glass fiber, preferably immediately after cooling. Depending upon the type of coating (i.e., thermoplastic, metallic thin film, polymeric matrix, etc. as described above), the coating compositions can be cured or otherwise treated to produce the coated optical fiber. The method of curing can be thermal, chemical, or radiation induced, such as by exposing the applied (and un-cured) coating composition on the glass fiber to ultraviolet light, actinic radiation, microwave radiation, or electron beam, depending upon the nature of the coating composition(s) and/or polymerization initiator being employed. It is frequently advantageous to apply both the primary coating composition and any secondary coating compositions in sequence following the draw process, then curing the coatings simultaneously. This is known as a wet-on-wet process. One method of applying dual layers of coating compositions to a moving glass fiber is disclosed in U.S. Pat. No. 4,474,830 to Taylor, which is hereby incorporated by reference. Another method for applying dual layers of coating compositions onto a glass fiber is disclosed in U.S. Pat. No. 4,581,165 to Rannell et al., which is hereby incorporated by reference. Of course, the primary coating composition can be applied and cured to form the primary coating material, then the secondary coating composition(s) can be applied and cured to form the secondary coating material(s). This is known as a wet-on-dry process.

During the coating of the glass fiber, the coated fiber is typically passed through one or more dies to adjust the thickness of the coating(s) thereon. Such passage through the die may result in shear forces that are sufficient to achieve the desired physical orientation or alignment of the plurality of magnetizable particles. However, to obtain the optimum orientation of at least a substantial portion of the plurality of magnetizable particles, the coated fiber can be subjected to a magnetic field while the coating composition is cured or otherwise treated to achieve the final coating.

Figure 8:
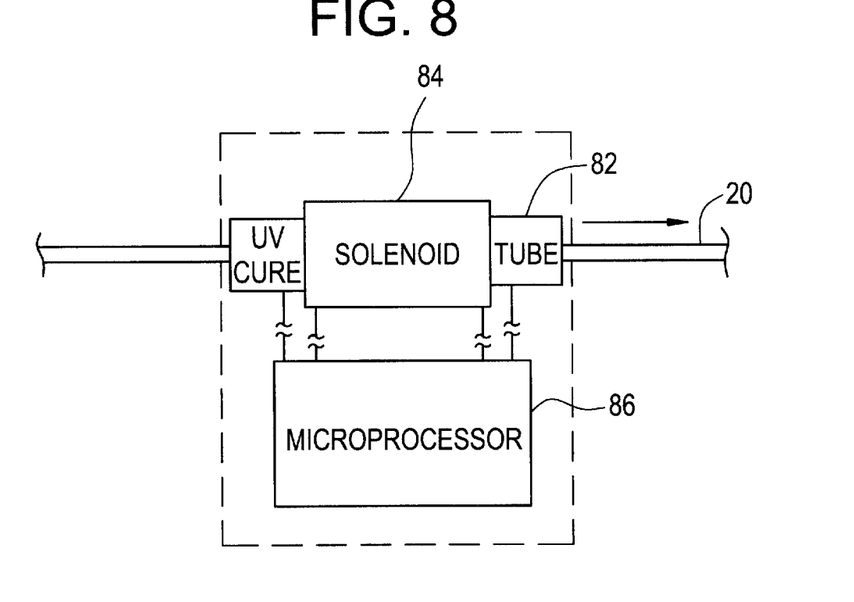
FIG. 8 illustrates one approach for imparting physical orientation of the magnetizable particles dispersed in a UV curable coating composition. After physically orienting the magnetizable particles, the UV curable coating composition is cured by passing through a UV cure tube of the type known in the art. During UV curing, however, the fiber is exposed to a magnetic field created by a solenoid to ensure that at least a substantial portion of the magnetizable particles retain their physical orientation during curing of the coating.

For example, as illustrated in FIG. 8, an optical fiber 20 possessing, e.g., a polymerizable secondary coating which includes a plurality of magnetizable particles, is introduced into a UV cure tube 82 in order to promote polymerization of the secondary coating. While passing through the UV cure tube 82, the optical fiber simultaneously passes through a solenoid 84 which exposes the optical fiber therein to a magnetic field of sufficient strength to maintain the physical orientation of at least a substantial portion of the plurality of magnetizable particles. The orientation field is preferentially in the range of 33 to 100% of the coercivity of the particles. Thus, for particles with a coercivity of 1500 oersteds, the orientation field is preferentially in the range of 500 to 1500 oersteds. Lower orientation fields may give less than the maximum degree of orientation possible, while higher orientation fields may increase capital and operating costs with insignificant improvement in orientation, as well as possibly producing deleterious bunching and chaining of the particles. Both the UV cure tube and the solenoid are operated by a microprocessor 86 which is a component of a draw tower. This treatment of the optical fiber before and/or during curing of a coating can be performed on the various coatings as described above, except for metallic thin films.

With optically encoded fibers of the present invention, the data signal preferably is encoded onto the optical fiber subsequent to curing of any coatings thereon. Thus, another aspect of the present invention relates to a method of digitally encoding information onto an optical fiber which is carried out by preparing an optical fiber including a fiber core and at least one coating including a material forming an optical data storage medium, and then treating the optical fiber under conditions effective to encode information into the optical data storage medium.

Similarly, magnetically encoded fibers of the present invention are also encoded with the data signal after formation of the finished optical fiber. Specifically, where the data storage medium is a magnetic data storage medium formed by a plurality of magnetizable particles, the exposing of the coated optical fiber to the recording signal is carried out in a manner effective to flip the magnetic moments of the particles from one stable direction to the reverse stable direction. By varying the direction of the applied magnetic field along the length of the fiber, the data signal is thus encoded.

Figure 9A:
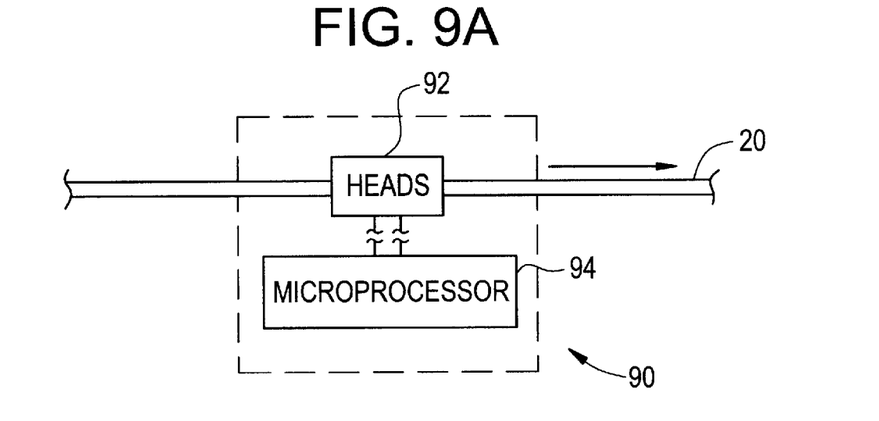
Figure 9B:
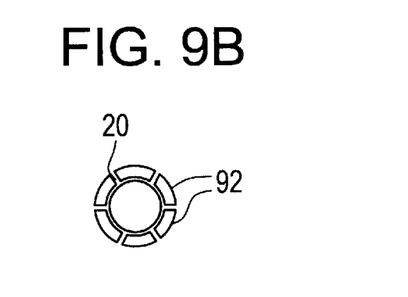
Figure 10:
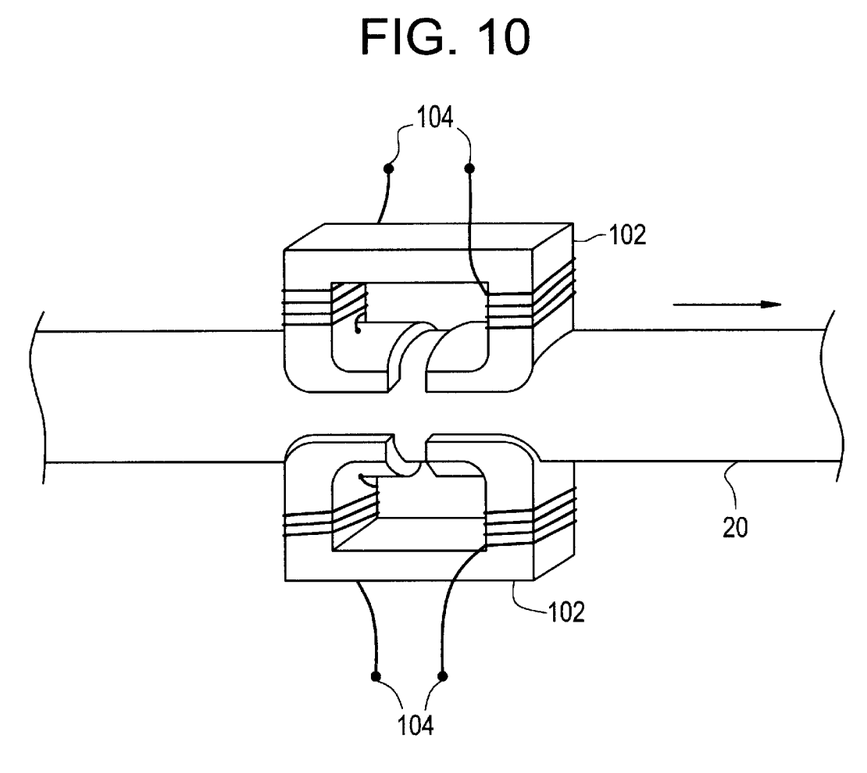
FIG. 10 is a perspective view illustrating an alternative embodiment for magnetizing the magnetic data storage medium substantially circumferentially about the optical fiber. A pair of recording heads conform to the shape of the optical fiber.

Devices capable of encoding a coated fiber with a data signal are known in the magnetic recording art and can readily be adapted for introduction into processes for preparing optical fibers. For example, as shown in FIGS. 9A-B, an encoding device 90 includes one or more write heads 92 under control of a microprocessor 94 which regulates the induction of a magnetic field by the heads 92. As shown in FIG. 9B, the optical fiber 20 is passed through an array of six write heads 92 to yield an optical fiber magnetically encoded with a data signal. Although six heads 92 are shown, it should be apparent to those of skill in the art that more or less heads can be used. For example, as shown in FIG. 10, a pair of write heads 102 (coupled to a microprocessor via connections 104) are provided which conform in shape to the optical fiber 20, allowing the write heads to encode the optical fiber about a substantial portion of its circumference as the optical fiber moves through the pair of heads.

Thus, a further aspect of the present invention relates to a method of digitally encoding information onto an optical fiber which is carried out by preparing an optical fiber including a fiber core and at least one coating including a material forming a magnetic data storage medium, and then exposing the optical fiber to a variable magnetic field under conditions effective to encode information onto the magnetic data storage medium. Optionally, this aspect of the present invention can also include exposing the optical fiber to a second variable magnetic field under conditions effective either to encode additional information onto the magnetic data storage medium or to both erase the originally encoded information from the magnetic data storage medium and encode new information onto the magnetic data storage medium.

Figure 13:
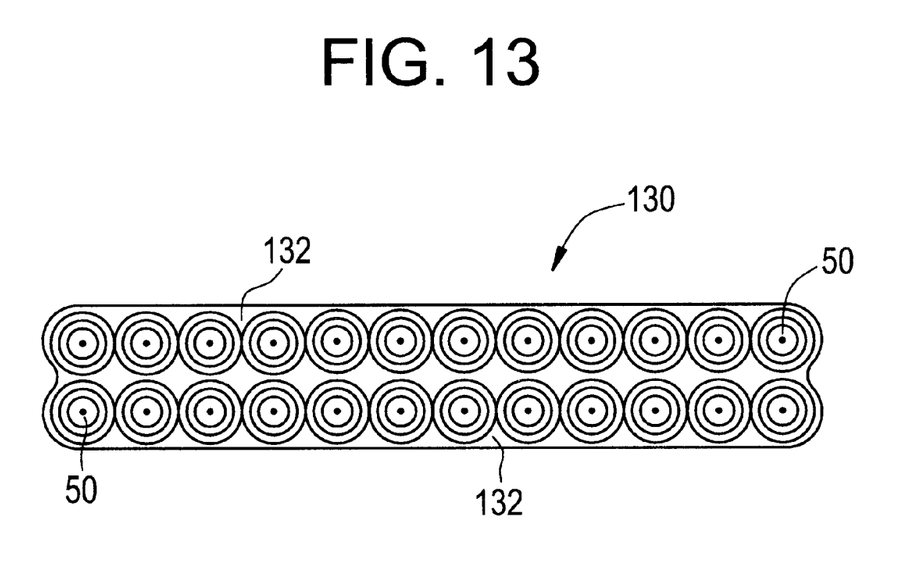
FIG. 13 is a cross-sectional view of a fiber bundle of the present invention.

Having prepared an optical fiber of the present invention (and encoded the same with information), it can be incorporated into a fiber bundle using known techniques. For example, as shown in FIG. 13, a fiber bundle 130 can be prepared using a plurality of optical fibers 50 of the present invention. The fibers are arranged into a plurality of rows of substantially parallel, substantially aligned optical fibers that are encapsulated in a protective matrix 132. Other configurations of fiber bundles can also be fabricated using the optical fibers of the present invention.

Figure 14:
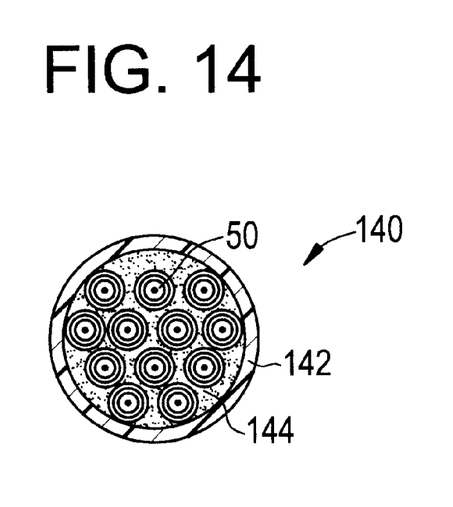
FIG. 14 is a cross-sectional view of a cable of the present invention.

In addition, the optical fibers or the fiber bundles can be incorporated into a cable using known techniques. For example, as shown in FIG. 14, a loose tube cable 140 includes a plurality of the present invention encapsulated by an outer sheath 142. Also enclosed within the sheath 142, and between each of the optical fibers 50, is a lubricant 144. Other cable types can also be fabricated using the optical fibers of the present invention.

A further aspect of the present invention relates to a method of reading information digitally encoded onto an optical fiber. This method is carried out by providing an optical fiber including at least one coating which includes a material forming a digital data storage medium, the digital data storage medium being encoded with a data signal which carries information, and then reading the optical fiber with a device which detects and processes the data signal, thereby retrieving the information.

Figure 11:
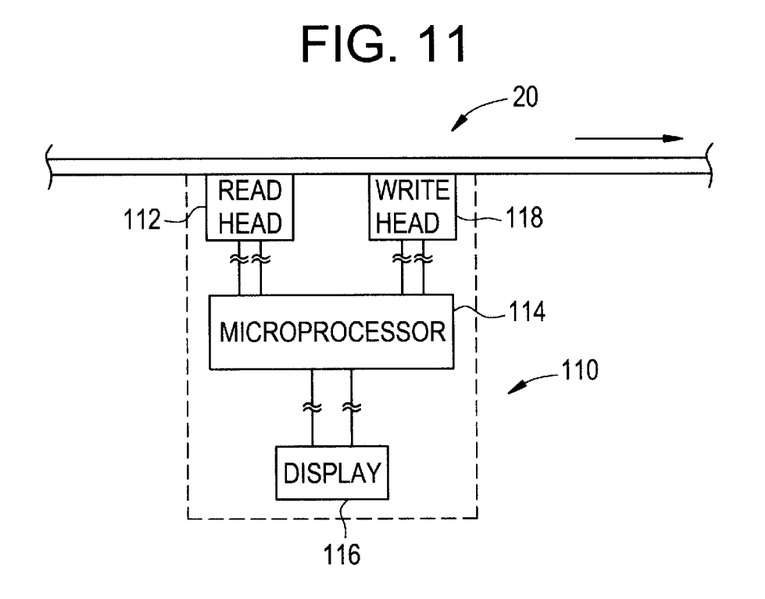
FIG. 11 is plan view of a device capable of retrieving the data encoded onto a magnetic data storage medium of an optical fiber of the present invention.

When the digital data storage medium is a magnetic data storage medium and the data signal is magnetically encoded, the process of reading the optical fiber is carried out with a device which detects and processes the magnetically encoded data signal. Retrieval of encoded data signals can be achieved using known sensors or transducers capable of converting magnetic signals of the present invention into an electrical signal for further processing. For example, as shown in FIG. 11, a reading device 110 includes a read head 112 and a microprocessor 114 coupled to the read head 112 to receive and process electrical signals received from the read head following its passage over the optical fiber 20 (i.e., when the optical fiber is drawn over the device in the direction of the arrow). Typically, the device 110 also includes a display 116 which can provide an operator of the device with a message conveying the information encoded by the data signal. Suitable read heads 112 include, without limitation, inductive read heads and magnetoresistive read heads. The reading device 110 may optionally be equipped with a write head 118 which can generate magnetic recording signals capable of recording a new data signal onto (or over an existing data signal of) an optical fiber of the present invention.

Figure 12:
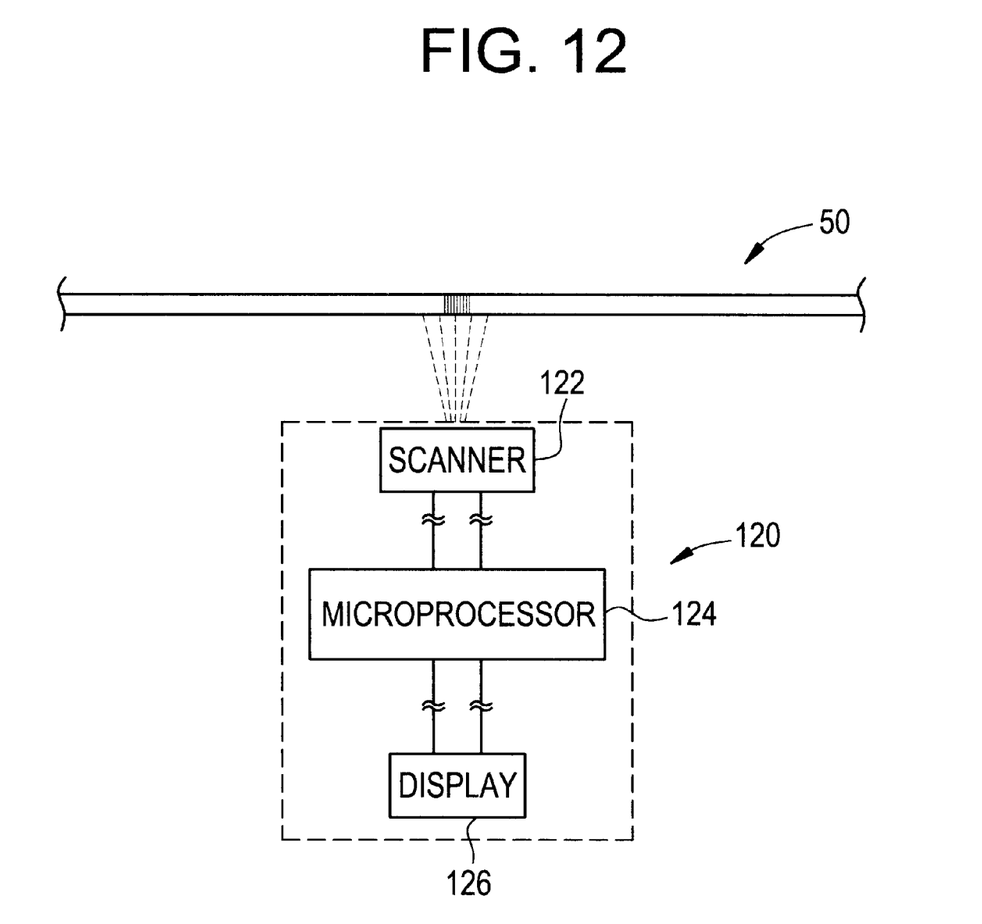
FIG. 12 is a plan view of a device capable of retrieving the data encoded onto an optical data storage medium of an optical fiber of the present invention.

When the digital data storage medium is an optical data storage medium and the data signal is optically encoded, the process of reading the optical fiber is carried out with a device which detects and processes the optically encoded data signal. Retrieval of encoded data signals can be achieved using known sensors or transducers capable of converting optically coded signals into an electrical signal for further processing. For example, as shown in FIG. 12, a reading device 120 includes a scanner 122 and a microprocessor 124 coupled to the scanner 122 to receive and process electrical signals received from the scanner following its passage over the optical fiber 50 (i.e., when the device is passed over the optically encoded portion of the optical fiber). Typically, the device 120 also includes a display 126 which can provide an operator of the device with a message conveying the information encoded by the data signal. Suitable scanners 112 include, without limitation, scanners of the type found in a conventional bar code scanning apparatus. Although reading device 120 is shown to include a movable laser beam, it should be apparent to those of skill in the art that an optical fiber can also be passed over a fixed laser readout device.

EXAMPLES

The following examples are provided to illustrate embodiments of the present invention, but they are by no means intended to limit its scope.

Example 1

Preparation of Polymeric Secondary Coating Containing Homogeneously Dispersed Magnetic Particles A secondary coating composition of the present invention can be prepared by dispersing 5 to 50 percent by volume of type 234 barium ferrite (Arnold Engineering, Inc., Norfolk, Nebr.) into a mixture containing about 10 weight percent of BR-301, a polyether urethane acrylate oligomer (Bomar Specialty Chemical, Winstead, Conn.); about 12 weight percent of Photomer 4025, an ethoxylated(8) bisphenol A diacrylate monomer (Cognis, Ambler, Pa.); about 20 weight percent Photomer 4127, a propoxylated neopentyl glycol diacrylate monomer (Cognis); about 55 weight percent of Photomer 4028, an ethoxylated(4) bisphenol A diacrylate monomer (Cognis); and about 0.2 wt. % (in excess, based on resin loading) of a neoalkoxy zirconate coupling agent (such as neopentyl(diallyl)oxy trimethacryl zirconate or neopentyl (diallyl)oxy triacryl zirconate) as a dispersant. A small media mill charged with 0.65 mm diameter zirconia grinding media (such as those available from Netzsch Inc. (Exton, Pa.) can be used to prepare the dispersion. The mixture should be milled until such time that the agglomerates are broken down to an acceptable range of about $\leq 2$ $\mu$m. Next, the photoinitiator (about 3 weight percent of Irgacure 1850, a commercial blend containing bis (2,6-dimethoxybenzoyl)-2,4,4-trimethylpentyl phosphine oxide and 1-hydroxycyclohexyl phenyl ketone, Ciba Specialty Chemical, Tarrytown, N.Y.) can be added and the mixture blended until homogeneous.

Example 2

Preparation of Optical Fibers

Using a secondary coating composition prepared as described in Example 1, primary and secondary coating materials can be applied to drawn glass fibers subsequent to cooling. An SMF 1528™ (Corning Incorporated, Corning, N.Y.) glass fiber having a diameter of about 125 $\mu$m was drawn on a draw tower using conventional procedures. The glass fiber can then be introduced into a chamber containing a primary coating composition.

The primary coating composition can include 52 wt % BR373 1, a polyether urethane acrylate (Bomar Specialty Co.); 45 wt % Photomer 4003, an ethoxylated nonylphenol acrylate (Cognis Corp.); 3 wt % Irgacure 1850, a photoinitiator commercial blend of 1-hydroxycyclohexyl phenyl ketone and bis(2,6-dimethoxybenzoyl)-2,4,4-trimethylpentyl phosphine oxide (Ciba Specialty Chemical); an excess of 1.0 pph of a bis(trimethoxysilylethyl)benzene (Gelest Corp., Tellytown, Pa.) adhesion promoter; an excess of 1.0 pph Irganox 1035; an excess of 0.5 pph Tegorad 2200, a polyalkoxypolysiloxane (Goldschmidt Chemical Co.); and an excess of 0.5 pph Unitac R40, a tackifier tall oil rosin ester (Union Camp Corp, Wayne, N.J.). The primary coating composition can be prepared as set forth in U.S. patent application Ser. No. 09/301,814, filed Apr. 29, 1999, to Fewkes et al., which is hereby incorporated by reference.

As the coated fiber is removed from the chamber, the thickness of the primary coating composition can be adjusted to about 32.5 µm by passing the coated fiber through a die. The primary coating composition can then be cured with ultraviolet radiation at a dose level of about 0.25 to 1.0 $J/cm^2$ using a D bulb (available from Fusion UV Systems, Inc.). The coated fiber can be drawn through a second coating chamber containing the secondary coating compositions prepared in Example 1. As the coated fiber is removed from the second chamber, the thickness of the secondary coating composition can be adjusted to about 27.5 µm by passing the coated fiber through a die. To establish and maintain longitudinal orientation of the barium hexaferrite particles, the coated fiber is exposed to a solenoid-induced magnetic field having a field strength of about 1000 oersteds at the fiber. This field is maintained until curing is completed by exposure to ultraviolet radiation at a dose level of about 0.25 to 1.0 $J/cm^2$ using a D bulb to produce an optical fiber having a diameter of about 245±10 µm.

Subsequent to curing of the secondary coating, the optical fiber is passed through a rapidly alternating magnetic field of a maximum intensity of about 5000 oersteds, producing distinct regions along the fiber which have positive polarity, reverse polarity, or no detectable polarity. By alternating signals it is possible to encode the fiber with a data signal that can be detected using a device capable of reading magnetically encoded articles.

Example 3

Preparation of Solvent-Based Secondary Composition Containing Homogeneously Dispersed Magnetic Particles and Preparation of Optical Fiber A secondary coating composition was prepared using the ingredients listed below, with the amount of such ingredients being expressed in terms of parts by weight relative to 100 parts of magnetic pigment. The formulation is as follows:

| Ingredient | Amount |
|---|---|
| Type 234 barium ferrite | 100 parts |
| Urethane resin N-2301 | 16 parts |
| VAGH resin | 4 parts |
| Colonate C-3401 | 5 parts* |
| Lecithin | 1.5 parts |
| n-Butyl stearate | 3 parts |
| Ketjen Black EC | 2 parts |
| Alumina | 3.5 parts* |
| Methyl ethyl ketone (MEK) | 150 parts** |
| Toluene | 150 parts** |
| Cyclohexanone | 150 parts** |

*Withheld from the premix
**100 parts withheld from the premix

Type 234 barium ferrite is a barium ferrite powder of approximately 3000 oersted coercivity commercially available from the Plastiform Division of Arnold Engineering, Norfolk, Nebr. Urethane resin N-2301 is a polyurethane resin commercially available from Nippon Polyurethane Industry Co., Tokyo, Japan. VAGH resin is a vinyl chloride/vinyl acetate/vinyl alcohol terpolymer resin commercially available from Nippon Polyurethane Industry Co., Tokyo, Japan. Colonate C-3041 is a polyisocyanate cross-linking agent (curative) commercially available from Nippon Polyurethane Industry Co., Tokyo, Japan. Lecithin is a commercially available dispersing agent. n-Butyl stearate is a commercially available fatty acid ester lubricant. Ketjen Black EC is a conductive carbon powder commercially available from Lion Akzo Co., Tokyo, Japan. Alumina is a commercially available abrasive powder with an average size of about 0.5 micron. Methyl ethyl ketone, toluene and cyclohexanone are technical grade solvents.

Procedure (A) Preparation of Premix

A high-solids premix was prepared. All components of the formulation went into the premix except those marked with asterisks. One-third (50 parts) of each of the three solvents was used as a base for the premix. The resins and then the powders were dispersed in the solvent mixture with a high-speed disk impeller disperser.

(B) Milling

The premix from (A) was transferred to a water-cooled vertical stirred bead mill. Milling was continued until microscopic examination of a glass slide smeared with the dispersion showed all particles to be well-dispersed, with no detectable agglomerates. The alumina powder was added, and the dispersion was milled for a brief additional time.

(C) Letdown to Final Dispersion

The milled dispersion from (B) was returned to the high-speed disk impeller disperser. After vigorous agitation was established, a mixture of the three solvents was gradually blended into the dispersion. Finally, just before coating, the cross-linking agent was blended into the dispersion.

(D) Coating of Optical Fiber

The starting material was a glass optical fiber with a primary coating of soft, compliant polymer. The fiber was passed through a coating chamber containing dispersion (C). A die was used to control the coating thickness such that the thickness of the dried secondary coating was approximately 25 µm. Drying of the solvent-based coating was carried out at approximately 60° C. under explosion-proof conditions. The secondary coating functioned as a tough, protective outer layer suitable for magnetic recording. The final cross-sectional configuration of the fiber was as shown in FIG. 3. The fiber was thoroughly air-cooled to 20° C. before being wound onto a spool.

Example 4

Preparation of Thermally Cured Inkjet Receptive Coating for an Optical Fiber and Application to Optical Fiber A thermally cured inkjet receptive coating was prepared with the following ingredients: Michem Prime 4983R, a 25-percent-solids dispersion of ethylene-acrylic acid copolymer commercially available from Michelman, Inc., 9080 Shell Road, Cincinnati, Ohio; Silica FK-310, an amorphous precipitated silica commercially available from Degussa Corp., 65 Challenger Road, Ridgefield Park, N.J. Aerosil MOX 170, a fumed silica of sub-100-mn primary particle size, also commercially available from Degussa; ethanol and deionized water.

Procedure (A) Preparation of 11% Solids Premix

To a 600-ml beaker was added 27.610 grams of Michem Prime 4983R dispersion. This was diluted with 149.494 grams of deionized water and stirred. Ethanol in the quantity of 53.188 grams was then stirred in. After mixing for a short time the dispersion was vigorously mixed and Aerosil MOX 170 (4.872 g) and Silica FK-310 (15.835 g) were added in that order. The mixture was then homogenized with a Silverson high-speed laboratory mixer, fitted with a disintegrating head, for approximately five minutes.

(B) Dilution of Dispersion to Coating Consistency

The premix from (A) was diluted to 2.75% solids by diluting 1 part of premix (A) with 3 parts of a 24% w/w solution of ethanol in deionized water and stirring vigorously. (The viscosity of the coating solution can be adjusted by varying the solids content of the coating solution within the preferred range of about 0.5 to about 6.0% solids.)

(C) Coating of Optical Fiber

The starting material was an optical fiber as shown in FIG. 1, having both a primary and secondary coating. Dispersion (B) was used to produce a tertiary coating suitable as an inkjet receptor. A clean dual-coated fiber was passed through a coating chamber containing dispersion (B). A die was used to control the weight of the tertiary coating to approximately 1.8 milligrams per square centimeter of fiber surface area. The coating was air dried at approximately 60° C. to produce a dry coating coverage of approximately 0.050 mg/cm$^2$. The fiber was thoroughly air-cooled to 20° C. before being wound onto a spool.

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. An optical fiber comprising:
    a fiber core and
    at least one coating substantially encapsulating the fiber core, wherein the at least one coating comprises a material forming a magnetic data storage medium which is capable of digitally encoding information at a data density of at least about 4 bits per centimeter.

2. The optical fiber according to claim 1, wherein the magnetic data storage medium is characterized by a coercivity of between about 100 to about 20,000 oersteds.

3. The optical fiber according to claim 1, wherein the magnetic data storage medium comprises a plurality of magnetized articles selected from the group consisting of magnetic ferrite oxides, metals, metal oxides, metal alloys, and combinations thereof.

4. The optical fiber according to claim 3, wherein the at least one coating is selected from the group consisting of a water-borne coating, a solvent-borne coating, a substantially polymerized matrix, and a thermoplastic coating, wherein the plurality of magnetized particles are dispersed therein.

5. The optical fiber according to claim 1, wherein the at least one coating and the material are in the form of a continuous magnetic film.

6. The optical fiber according to claim 1, wherein the at least one coating comprises
    a first coating comprising a first material forming a magnetic data storage medium which is capable of digitally encoding information at a data density of at least about 4 bits per centimeter and
    a second coating comprising a second material forming an optical data storage medium which is capable of digitally encoding information at a data density of at least about 4 bits per centimeter.

7. The optical fiber according to claim 1, wherein the magnetic data storage medium has a data density of at least about 10 bits per centimeter.

8. A fiber bundle comprising one or more optical fibers according to claim 1.

9. A cable comprising a fiber bundle according to claim 8.

10. A cable comprising an optical fiber according to claim 1.

11. A method of making an optical fiber comprising:
    providing a fiber core and
    encapsulating the fiber core with a coating comprising a material forming a magnetic data storage medium which is capable of digitally encoding information.

12. The method according to claim 11, wherein the coating and the material are in the form of a continuous magnetic film and said encapsulating comprises covering the fiber core with the magnetic film.

13. The method according to claim 12, wherein said covering comprises electroless plating, ion sputtering, vacuum metallization, or organo-metallic deposition.

14. The method according to claim 11, wherein the coating comprises a substantially polymerized matrix and the material comprises a plurality of magnetizable particles, said encapsulating comprising:
    covering the fiber core with a polymerizable composition comprising the plurality of magnetizable particles and
    treating the polymerizable composition under conditions effective to yield the substantially polymerized matrix.

15. The method according to claim 14, wherein said treating comprises exposing the polymerizable composition to thermal treatment, chemical treatment, electron beam treatment, microwave treatment, actinic-radiation treatment, or ultraviolet light treatment.

16. The method according to claim 14, further comprising after said covering:
    orienting the plurality of magnetizable particles within the polymerizable composition prior to and, optionally, during said treating.

17. The method according to claim 11, wherein the coating is a substantially solid thermoplastic compound or mixture and the material comprises a plurality of magnetizable particles, said encapsulating comprising:
    covering the fiber core with a flowable thermoplastic compound or mixture comprising the plurality of magnetizable particles and
    treating the flowable thermoplastic compound or mixture under conditions effective to yield the substantially solid thermoplastic compound or mixture.

18. The method according to claim 17 further comprising after said covering:
    orienting the plurality of magnetizable particles within the flowable thermoplastic compound or mixture prior to and, optionally, during said treating.

19. A method of digitally encoding information onto an optical fiber comprising:
    preparing an optical fiber comprising a fiber core and at least one coating comprising a material forming a magnetic data storage medium; and
    exposing the optical fiber to a variable magnetic field under conditions effective to encode information into the magnetic data storage medium.

20. The method according to claim 19, further comprising:
    second exposing the optical fiber to a second variable magnetic field under conditions effective to encode additional information onto the magnetic data storage medium.

21. The method according to claim 20, wherein said second exposing is carried out under conditions effective simultaneously to erase the information from the magnetic data storage medium.

22. A method of reading information digitally encoded onto an optical fiber comprising:

providing an optical fiber comprising at least one coating which comprises a material forming a digital magnetic data storage medium, the digit magnetic data storage medium being magnetically encoded with a data signal which carries information; and reading the optical fiber with a device which detects and processes the data signal, thereby retrieving the information.

23. The method according to claim 22, wherein said reading is carried out with a device which detects and processes the magnetically encoded data signal.

* * * * *